United States Patent
Lee et al.

(10) Patent No.: US 6,927,746 B2
(45) Date of Patent: Aug. 9, 2005

(54) APPARATUS AND METHOD FOR DETECTING DISPLAY MODE

(75) Inventors: Yoon-nam Lee, Suwon-si (KR); Joo-sun Hong, Suwon-si (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 305 days.

(21) Appl. No.: 10/259,836

(22) Filed: Sep. 30, 2002

(65) Prior Publication Data

US 2003/0076445 A1 Apr. 24, 2003

(30) Foreign Application Priority Data

Sep. 29, 2001 (KR) ........................................ 2001-61037

(51) Int. Cl.$^7$ ................................................ G09G 5/00
(52) U.S. Cl. ...................... 345/3.2; 345/3.1; 345/1.1; 348/558
(58) Field of Search .................... 345/1.1, 3.1–3.4, 345/99, 212, 213, 699; 348/448, 554, 555, 558

(56) References Cited

U.S. PATENT DOCUMENTS

| | | | | |
|---|---|---|---|---|
| 5,448,260 A | * | 9/1995 | Zenda et al. ................ | 345/100 |
| 5,530,484 A | * | 6/1996 | Bhatt et al. ................. | 348/556 |
| 5,777,520 A | * | 7/1998 | Kawakami .................. | 331/1 R |
| 6,046,737 A | * | 4/2000 | Nakamura .................. | 345/213 |
| 6,130,721 A | * | 10/2000 | Yoo et al. ................... | 348/558 |
| 6,154,604 A | * | 11/2000 | Iwasaki ...................... | 386/131 |
| 6,348,931 B1 | * | 2/2002 | Suga et al. ................. | 345/699 |
| 6,456,268 B1 | * | 9/2002 | Takeda ....................... | 345/92 |
| 6,483,502 B2 | * | 11/2002 | Fujiwara .................... | 345/213 |
| 6,577,322 B1 | * | 6/2003 | Fukuda ....................... | 345/698 |
| 6,670,964 B1 | * | 12/2003 | Ward et al. ................ | 345/660 |
| 6,784,941 B1 | * | 8/2004 | Su et al. .................... | 348/445 |

FOREIGN PATENT DOCUMENTS

| | | |
|---|---|---|
| CN | 1237854 A | 12/1999 |
| JP | 10-83174 A | 3/1998 |
| KR | P1999-012462 | 2/1999 |

OTHER PUBLICATIONS

Automatic Mode Adjustment, May 1, 1994, IBM Technical Disclosure Bulletin, vol. 37, pp. 469–470.*

* cited by examiner

*Primary Examiner*—Bipin Shalwala
*Assistant Examiner*—Tom Sheng
(74) *Attorney, Agent, or Firm*—Sughrue Mion, PLLC

(57) ABSTRACT

An apparatus and method for automatically detecting a display mode to be used in a serial data interface (SDI) of a decoded video signal is provided. The apparatus for detecting a display mode includes a mode detector which detects a predetermined display mode by counting clock pulses generated between a present horizontal synchronous signal and a next horizontal synchronous signal from input decoded video signals, and a signal processing unit which converts formats of the decoded video signals so as to correspond to a display mode detected by the mode detector, serializes and outputs the decoded video signal. By deleting a control signal indicating a display mode, a control signal that does not coincide with processed data as a result of an incorrectly or incompatibly designed controller can be prevented.

8 Claims, 5 Drawing Sheets

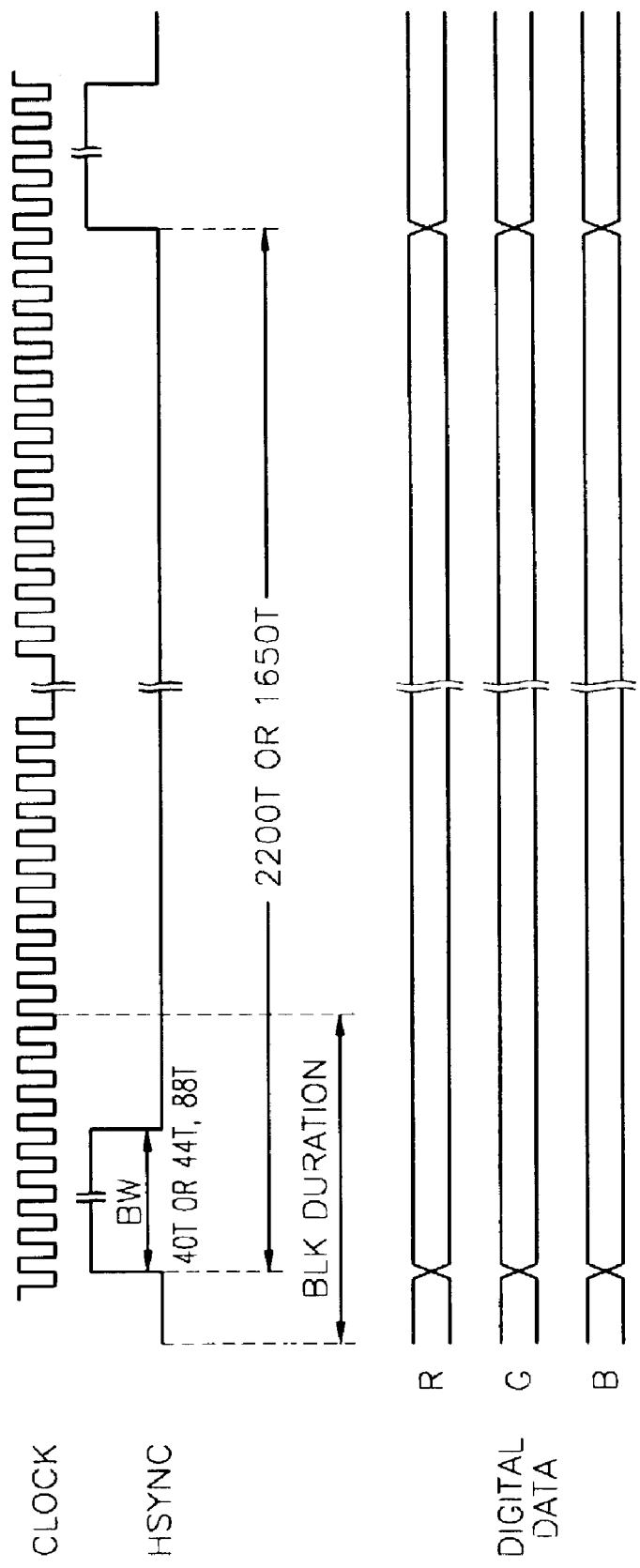

APPARATUS AND METHOD FOR DETECTING DISPLAY MODE

BACKGROUND OF THE INVENTION

1. Field of the Invention

The present invention relates to the field of display apparatuses and methods, and more particularly, to an apparatus and method for automatically detecting a display mode to be used in a serial data interface (SDI) of a decoded video signal. The present application is based on Korean Patent Application No. 2001-61037, filed Sep. 29, 2001, which is incorporated herein by reference.

2. Description of the Related Art

FIG. 1 is a block diagram illustrating the structure of a conventional apparatus for detecting a display mode. Referring to FIG. 1, the conventional apparatus for detecting a display mode includes a video processor 10, a controller 11, and a serial data interface (SDI) processor 12. The video processor 10 decodes an input MPEG video stream, converts the format of the input MPEG video stream into the format of a 1080i or 720p mode and transmits a parallel digital video signal to the SDI processor 12. The SDI processor 12 converts input parallel data into the format of SDI, and serializes and outputs the input parallel data. That is, the SDI processor 12 outputs a SDI signal suitable for each mode in response to the 1080i or 720p mode control signal. The 1080i or 720p mode is selected by a user, and the controller 11 outputs a mode control signal to the SDI processor 12 in response to the mode select signal.

The mode select signal is input by the user to the controller 11, and the controller 11 outputs a control signal suitable for a selected mode to the SDI processor 12. However, many times, due to wrong design of the controller 11, the mode select signal input by the user does not coincide with the mode control signal output from the controller 11.

SUMMARY OF THE INVENTION

To solve the above and related problems, it is a first objective of the present invention to provide an apparatus for automatically detecting a display mode by directly analyzing a decoded video signal input by a video processing unit without receiving a mode control signal output from a controller.

It is a second objective of the present invention to provide a method for automatically detecting a display mode by directly analyzing a decoded video signal input by a video processing unit without receiving a mode control signal output from a controller.

Accordingly, to achieve the first objective, according to one aspect of the present invention, there is provided an apparatus for detecting a display mode. The apparatus includes a mode detector which detects a predetermined display mode by counting clock pulses generated between a present horizontal synchronous signal and a next horizontal synchronous signal from input decoded video signals, and a signal processing unit which converts formats of the decoded video signal so as to correspond to a display mode detected by the mode detector, serializes and outputs the decoded video signal.

It is preferable that the mode detector detects an analogue display mode or a digital display mode in which the number of clock pulses generated between the present horizontal synchronous signal and the next horizontal synchronous signal is different, and the number of clock pulses counted for a horizontal synchronous signal duration in the analogue display mode is smaller than the number of clock pulses counted at the horizontal synchronous signal duration in the digital display mode.

To achieve the first objective, according to another aspect of the present invention, there is provided an apparatus for detecting a display mode. The apparatus includes a mode detector which detects a predetermined display mode by counting clock pulses generated at the bandwidth of a horizontal synchronous signal from input decoded video signals, and a signal processing unit which converts formats of the decoded video signal so as to correspond to a display mode detected by the mode detector, serializes and outputs the decoded video signal.

It is preferable that the mode detector detects an analogue display mode or a digital display mode in which the number of clock pulses generated at the bandwidth of the horizontal synchronous signal is different, and the number of clock pulses counted at the bandwidth of the horizontal synchronous signal in the analogue display mode is smaller than the number of clock pulses counted at the bandwidth of the horizontal synchronous signal in the digital display mode.

To achieve the second objective, according to one aspect of the present invention, there is provided a method for detecting a display mode. The method includes the steps of (a) counting clock pulses generated between a present horizontal synchronous signal and a next horizontal synchronous signal from input decoded video signals, (b) comparing the number of counted clock pulses with a predetermined reference value and detecting a display mode, and (c) converting formats of the decoded video signal so as to correspond to the detected display mode and serializing and outputting the decoded video signal.

It is preferable that in the step (b), an analogue display mode or a digital display mode in which the difference of number of clock pulses generated between the present horizontal synchronous signal and the next horizontal synchronous signal is detected, and the number of clock pulses counted for a horizontal synchronous signal duration in the analogue display mode is smaller than the number of clock pulses counted for the horizontal synchronous signal duration in the digital display mode.

To achieve the second objective, according to another aspect of the present invention, there is provided a method for detecting a display mode. The method includes the steps of (a) counting clock pulses generated at the bandwidth of a horizontal synchronous signal among input decoded video signals, (b) comparing the number of counted clock pulses with a predetermined reference value and detecting a display mode, and (c) converting formats of the decoded video signal so as to correspond to the detected display mode and serializing and outputting the decoded video signal.

It is preferable that in the step (b), an analogue display mode or a digital display mode in which the difference of number of clock pulses generated at the bandwidth of the horizontal synchronous signal is detected, and the number of clock pulses counted at the bandwidth of the horizontal synchronous signal in the analogue display mode is smaller than the number of clock pulses counted at the bandwidth of the horizontal synchronous signal in the digital display mode.

BRIEF DESCRIPTION OF THE DRAWINGS

The above objectives and advantages of the present invention will become more apparent by describing in detail preferred embodiments thereof with reference to the attached drawings in which:

FIG. 5 illustrates a waveform for explaining mode detection.

DETAILED DESCRIPTION OF THE INVENTION

Hereinafter, a preferred embodiment of the present invention will be described in detail with reference to the accompanying drawings.

Figure 1:
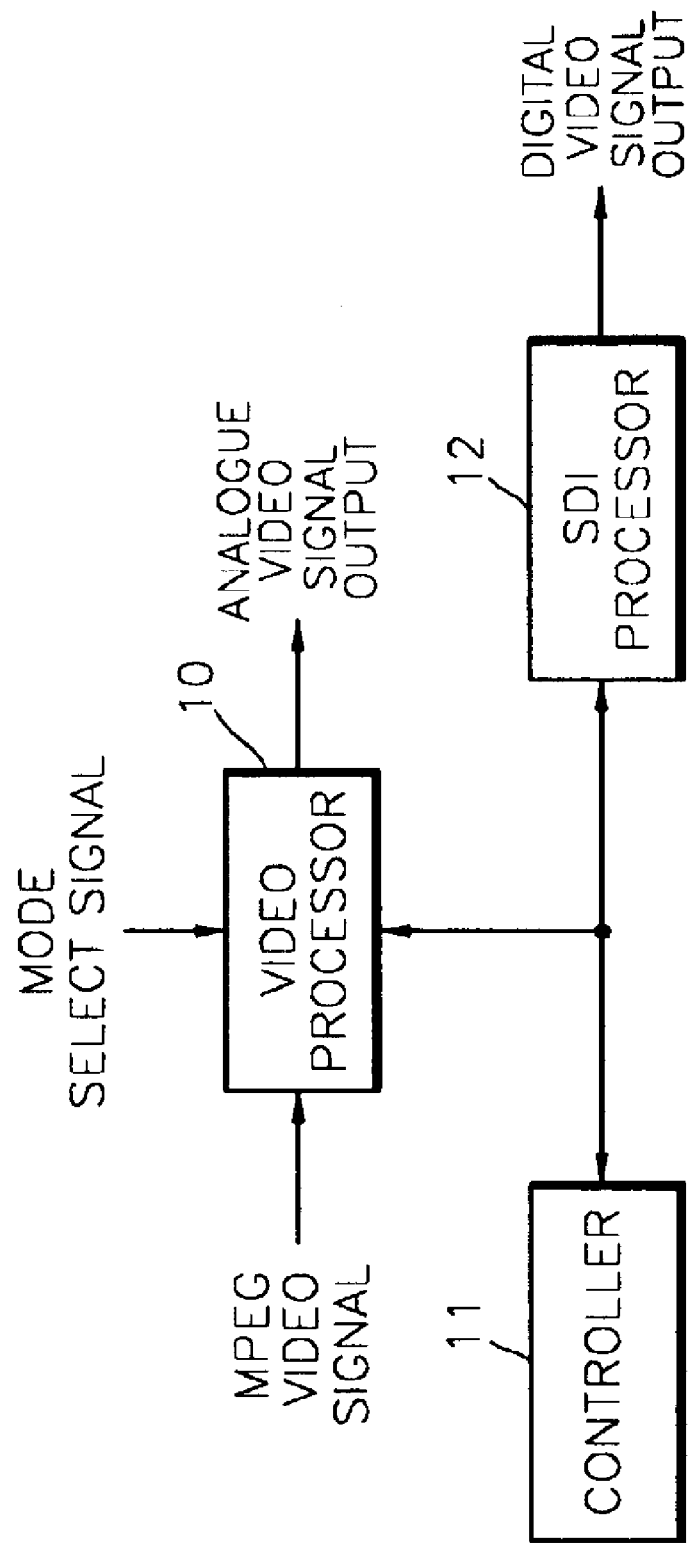
FIG. 1 is a block diagram illustrating the structure of a conventional apparatus for detecting a display mode.
Figure 2:
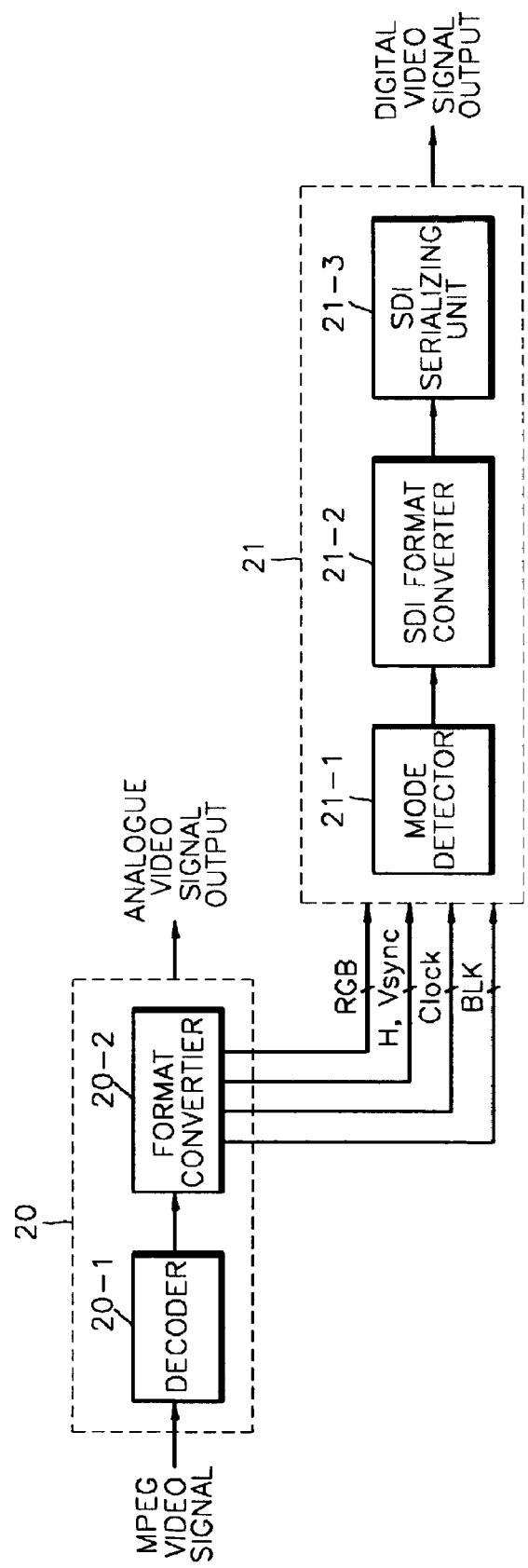
FIG. 2 is a block diagram illustrating the structure of an apparatus for detecting a display mode according to the present invention.

FIG. 2 is a block diagram illustrating the structure of an apparatus for detecting a display mode according to the present invention. The apparatus for detecting a display mode includes a video processing unit 20 and a serial data interface (SDI) processing unit 21. The video processing unit 20 includes a decoder 20-1 for decoding an input MPEG video signal and a format converter 20-2 for converting formats of a decoded video signal into the format of a 1080i and 720p mode. The SDI processing unit 21 includes a mode detector 21-1 for detecting a 1080i or 720p display mode using a horizontal synchronous signal, a clock signal, and a blank signal output from the video processing unit 20, and a SDI format converter 21-2 for converting an input video signal into the format of time reference signal (TRS) according to a detected mode, and a SDI serializing unit 21-3 for serializing and outputting the TRS format-converted video signal.

Figure 3:
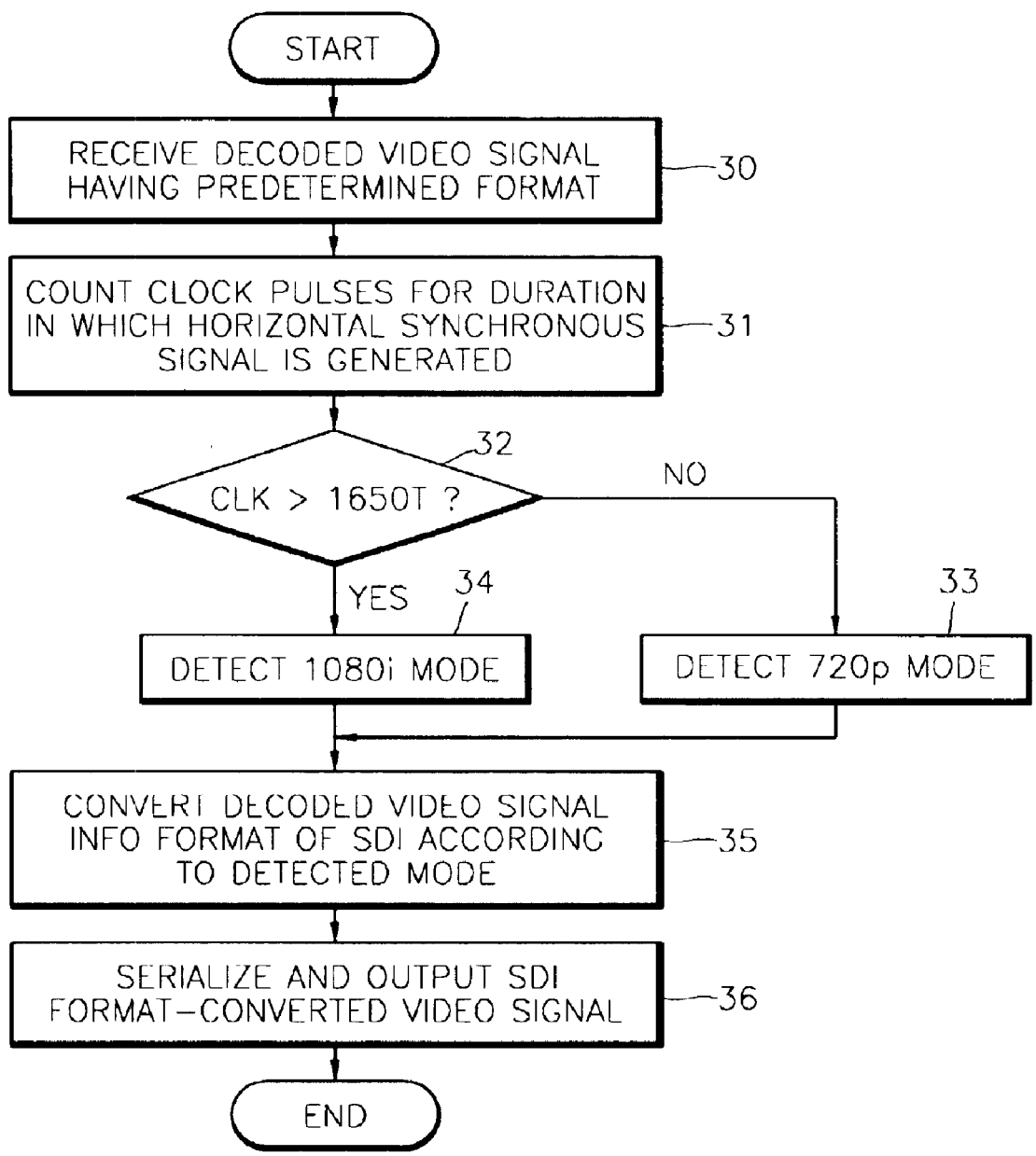
FIG. 3 is a flow chart illustrating a method for detecting a display mode according to a first embodiment of the present invention.

FIG. 3 is a flow chart illustrating a method for detecting a display mode according to a first embodiment of the present invention. Referring to FIG. 3, the method for detecting a display mode according to the first embodiment of the present invention includes the steps of receiving a decoded video signal having a predetermined format (step 30), counting clock pulses for a duration in which the horizontal synchronous signal is generated (step 31), determining whether or not the number of counted clock pulses is larger than 1650T (step 32), detecting a 720p mode (step 33), detecting a 1080i mode (step 34), converting the decoded video signal into the format of SDI according to the detected mode (step 35), and serializing and outputting the SDI format-converted video signal (step 36).

Figure 4:
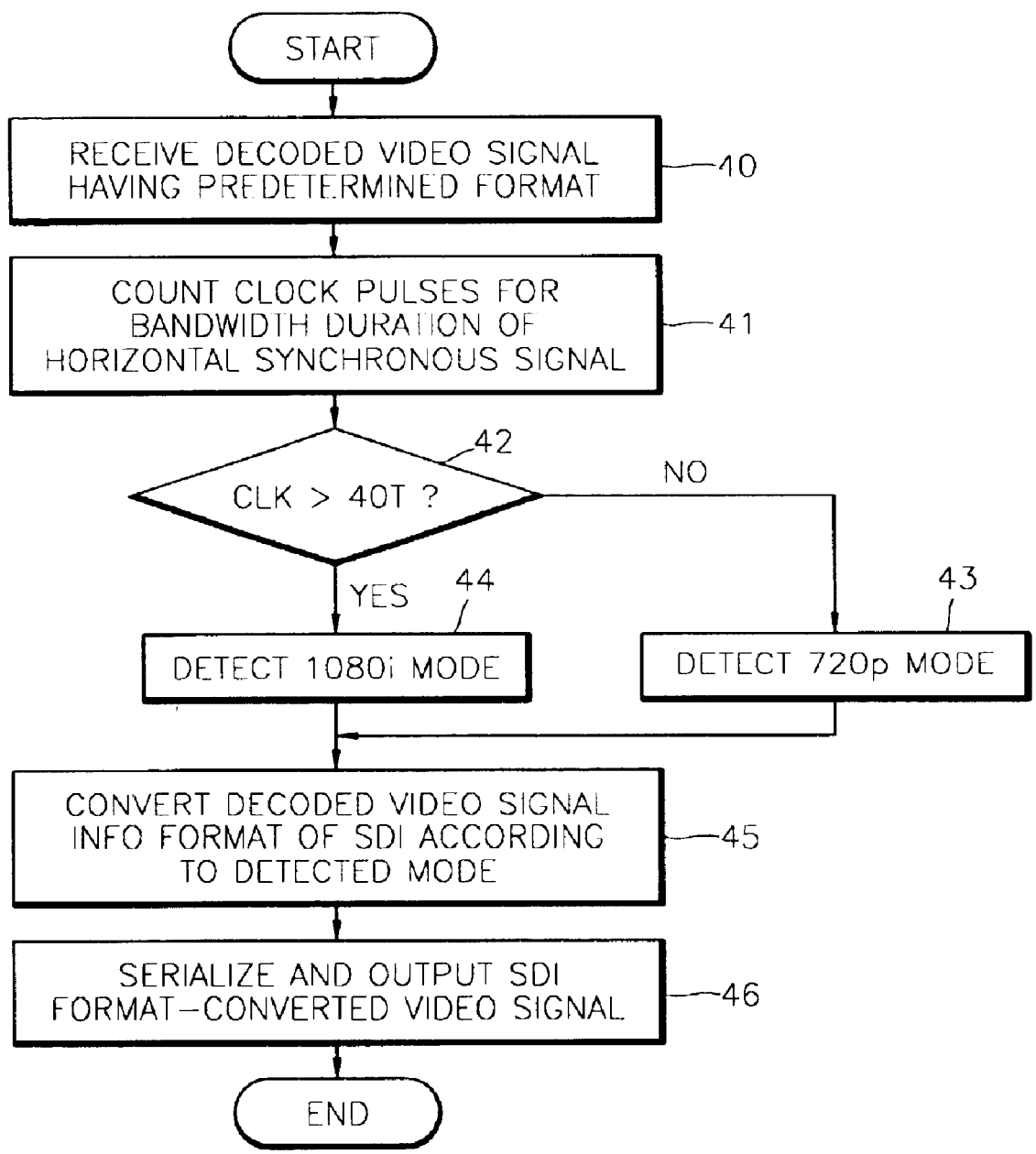
FIG. 4 is a flow chart illustrating a method for detecting a display mode according to a second embodiment of the present invention.

FIG. 4 is a flow chart illustrating a method for detecting a display mode according to a second embodiment of the present invention. Referring to FIG. 4, the method for detecting a display mode according to the second embodiment of the present invention includes the steps of receiving a decoded video signal having a predetermined format (step 40), counting clock pulses for a bandwidth duration of the horizontal synchronous signal (step 41), determining whether or not the number of counted clock pulses is larger than 40T (step 42), detecting a 720p mode (step 43), detecting a 1080i mode (step 44), converting the decoded video signal into the format of SDI according to the detected mode (step 45), and serializing and outputting the SDI format-converted video signal (step 46).

FIG. 5 illustrates a waveform for explaining mode detection.

Hereinafter, the present invention will be described in detail with reference to FIGS. 2 through 5.

In the method for detecting a display mode by counting clock pulses generated between the present horizontal synchronous signal and the next horizontal synchronous signal according to the first embodiment of the present invention, in step 30, a decoded video signal having a predetermined format is received. The decoder 20-1 decodes the input MPEG video signal, and the format converter 20-2 converts the formats of the decoded video signal into the format of a 1080i and 270p. The format converter 20-2 outputs a RGB (or YPbPr) signal, a clock signal CLK, a horizontal synchronous signal Hsync, a vertical synchronous signal Vsync, and a blank signal BLK, and the SDI processor 21 receives signals output from the format converter 20-2.

In step 31, the mode detector 22-1 counts clock pulses for the duration in which the horizontal synchronous signal is generated. The mode detector 22-1 counts clock pulses for the duration in which the horizontal synchronous signal from various signals output from the format converter 20-2 is generated. That is, the mode detector 22-1 counts clock pulses generated between the present horizontal synchronous signal and the next horizontal synchronous signal.

In steps 32, 33, and 34, the mode detector 22-1 counts clock pulses on the basis of 1650T, and when the number of the counted clock pulses is larger than 1650T, a 1080i mode is detected, and when the number of the counted clock pulses is not larger than 1650T, a 720p mode is detected. As shown in FIG. 5, in case of a 1080i mode, the number of clock pulses generated between the present horizontal synchronous signal and the next horizontal synchronous signal is 2200T. In case of a 720p mode, the number of clock pulses generated between the present horizontal synchronous signal and the next horizontal synchronous signal is 1650T. Accordingly, the mode detector 22-1 detects a display mode by counting clock pulses generated between the present horizontal synchronous signal and the next horizontal synchronous signal. Besides, the mode detector 22-1 can detect a display mode by counting clock pulses generated for a blank signal duration. This is the reason the number of clock pulses generated for a horizontal synchronous signal duration varies depending on a display mode, and thus the number of clock pulses at the blank signal duration is different.

In step 35, if the 1080i or 720p mode is detected, the decoded video signal is converted into the format of SDI according to the detected mode. The SDI format converter 21-2 converts the video signal input into the SDI processor 21 into the format of SDI, i.e., the format of TRS, in response to the mode detection signal output from the mode detector 21-1. The SDI format converter 21-2 converts the input video signal into the format of TRS comprised of start available video (SAV), end available video (EAV), line number, and synchronous and video screen starting position information.

In step 36, the SDI serializing unit 21-3 serializes and outputs the SDI format-converted video signal.

In the method for detecting a display mode by counting clock pulses generated at the bandwidth of the horizontal synchronous signal according to the second embodiment of the present invention, in step 40, a decoded video signal having a predetermined format is received. The decoder 20-1 decodes the input MPEG video signal, and the format converter 20-2 converts the formats of the decoded video signal into the format of a 1080i and 720p mode. The format converter 20-2 outputs a RGB (or YPbPr) signal, a clock signal CLK, a horizontal synchronous signal Hsync, a vertical synchronous signal Vsync, and a blank signal BLK, and the SDI processor 21 receives signals output from the format converter 20-2.

In step 41, the mode detector 22-1 counts clock pulses for the duration in which the horizontal synchronous signal is generated. The mode detector 22-1 counts clock pulses for the duration in which the horizontal synchronous signal from various signals output from the format converter 20-2 is generated. That is, the mode detector 22-1 counts clock pulses generated at the bandwidth of the horizontal synchronous signal.

In steps 42, 43, and 44, the mode detector 22-1 counts clock pulses on the basis of 40T, and when the number of counted clock pulses is larger than 40T, a 1080i mode is detected, and when the number of the counted clock pulses is not larger than 40T, a 720p mode is detected. As shown in FIG. 5, in case of a 1080i mode, the number of clock pulses generated at the bandwidth of the horizontal synchronous signal is 44T or 88T. In case of a 720p mode, the number of clock pulses generated at the bandwidth of the horizontal synchronous signal is 40T. Accordingly, the mode detector 22-1 detects a display mode by counting clock pulses generated between the present horizontal synchronous signal and the next horizontal synchronous signal. Besides, the mode detector 22-1 can detect a display mode by counting clock pulses generated for a blank signal duration. This is the reason the bandwidth of the horizontal synchronous signal varies depending on a display mode, and thus the number of clock pulses for the blank signal duration is different.

In step 45, if the 1080i or 720p mode is detected, the decoded video signal is converted into the format of SDI according to the detected mode. The SDI format converter 21-2 converts the video signal input into the SDI processor 21 into the format of SDI, i.e., the format of TRS, in response to the mode detection signal output from the mode detector 21-1. The SDI format converter 21-2 converts the input video signal into the format of TRS comprised of start available video (SAV), end available video (EAV), line number, and synchronous and video screen starting position information.

In step 46, the SDI serializing unit 21-3 serializes and outputs the SDI format-converted video signal.

As described above, by deleting a control signal indicating a display mode, a control signal that does not coincide with processed data as a result of an incorrectly or incompatibly designed controller can be prevented when a circuit for detecting a display mode is designed. In addition, the apparatus and method for detecting a display mode according to the present invention match the specifications of signals for each mode, and thus match the specifications of signals for each mode without an additional control signal even when using a larger SDI.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for detecting a display mode comprising:

a mode detector which detects an analogue display mode or a digital display mode in which a number of clock pulses generated between the present horizontal synchronous signal and the next horizontal synchronous signal in the analogue display mode is different from a number of clock pulses generated between the present horizontal synchronous signal and the next horizontal synchronous signal in the digital display mode by counting clock pulses generated between a present horizontal synchronous signal and a next horizontal synchronous signal from input decoded video signals; and a signal processing unit which converts formats of the decoded video signal so as to correspond to the display mode detected by the mode detector, serializes and outputs the decoded video signal.

2. The apparatus of claim 1, wherein the number of clock pulses counted for a horizontal synchronous signal duration in the analogue display mode is smaller than the number of clock pulses counted for a horizontal synchronous signal duration in the digital display mode.

3. An apparatus for detecting a display mode comprising:

a mode detector which detects an analogue display mode or a digital display mode in which a number of clock pulses generated at the bandwidth of the horizontal synchronous signal in the analogue display mode is different from a number of clock pulses generated at the bandwidth of the horizontal synchronous signal in the digital display mode by counting clock pulses generated at the bandwidth of a horizontal synchronous signal from input decoded video signals; and a signal processing unit which converts formats of the decoded video signals so as to correspond to a display mode detected by the mode detector, serializes and outputs the decoded video signals.

4. The apparatus of claim 3, wherein the number of clock pulses counted at the bandwidth of the horizontal synchronous signal in the analogue display mode is smaller than the number of clock pulses counted at the bandwidth of the horizontal synchronous signal in the digital display mode.

5. A method for detecting a display mode comprising:

(a) counting clock pulses generated between a present horizontal synchronous signal and a next horizontal synchronous signal from input decoded video signals;

(b) comparing the number of counted clock pulses with a predetermined reference value and detecting an analogue display mode or a digital display mode based on a difference of a number of clock pulses generated between the present horizontal synchronous signal of the analogue display mode and a number of clock pulses generated between the present horizontal synchronous signal and the next horizontal synchronous signal of the digital display mode; and (c) converting formats of the decoded video signals so as to correspond to the detected display mode and serializing and outputting the decoded video signals.

6. The method of claim 5, wherein the number of clock pulses counted for a horizontal synchronous signal duration in the analogue display mode is smaller than the number of clock pulses counted for the horizontal synchronous signal duration in the digital display mode.

7. A method for detecting a display mode comprising:
(a) counting clock pulses generated at the bandwidth of a horizontal synchronous signal among input decoded video signals;
(b) comparing the number of counted clock pulses with a predetermined reference value and detecting an analogue display mode or a digital display mode based on a difference of a number of clock pulses generated at the bandwidth of the horizontal synchronous signal in an analogue display mode and a number of clock pulses generated at the bandwidth of the horizontal synchronous signal in a digital display mode; and
(c) converting formats of the decoded video signals so as to correspond to the detected display mode and serializing and outputting the decoded video signals.

8. The method of claim 7, wherein the number of clock pulses counted at the bandwidth of the horizontal synchronous signal in the analogue display mode is smaller than the number of clock pulses counted at the bandwidth of the horizontal synchronous signal in the digital display mode.

* * * * *